United States Patent

Kamimoto et al.

[11] Patent Number: 5,870,207
[45] Date of Patent: Feb. 9, 1999

[54] FACSIMILE SYSTEM

[75] Inventors: Yoshimi Kamimoto; Taiji Yamamoto; Ryuji Hosaka; Toshitaka Nakagawa; Yutaka Uehara, all of Saitama, Japan

[73] Assignee: Fuji Xerox Co., Ltd., Tokyo, Japan

[21] Appl. No.: 913,615

[22] Filed: Jul. 16, 1992

[30] Foreign Application Priority Data

Jul. 17, 1991 [JP] Japan ............................. 3201055
Jul. 23, 1991 [JP] Japan ............................. 3205711
Jul. 23, 1991 [JP] Japan ............................. 3205712

[51] Int. Cl.⁶ ............................................. G06K 9/20
[52] U.S. Cl. ....................................................... 358/438
[58] Field of Search ............................. 358/434, 440, 358/444, 436, 407, 408, 409

[56] References Cited

U.S. PATENT DOCUMENTS

| | | | |
|---|---|---|---|
| 4,377,006 | 3/1983 | Collins | 455/603 |
| 4,851,896 | 7/1989 | Muranaya | 358/443 |
| 4,941,170 | 3/1989 | Herbst | 379/100 |
| 4,943,868 | 2/1989 | Yoshinaga | 358/403 |
| 4,989,237 | 1/1991 | Kotani | 358/473 |
| 4,994,926 | 2/1991 | Gordon | 358/400 |
| 5,123,063 | 6/1992 | Ohkubo | 358/408 |
| 5,153,744 | 8/1990 | Nobuta | 358/400 |
| 5,172,243 | 9/1989 | Hayashi | 358/400 |

FOREIGN PATENT DOCUMENTS

| | | |
|---|---|---|
| 0455157 | 4/1991 | European Pat. Off. . |
| 63-193658 | 8/1988 | Japan . |
| 2-49264 | 4/1990 | Japan . |
| 3-155276 | 7/1991 | Japan . |

*Primary Examiner*—Sandra O'Shea
*Attorney, Agent, or Firm*—Finnegan, Henderson, Farabow, Garrett & Dunnet, L.L.P.

[57] ABSTRACT

A facsimile system having a terminal and a main body. The terminal reads an image and sends the read image to the main body, and the main body transmits the image data received from the terminal through a communication line. The terminal includes a processing instructing unit for instructing processing of the read image at the main body; a first storage unit for storing an identification code specifically assigned to the terminal; and a sending unit for sending to the main body the image data, the instruction data instructed by the processing instructing unit, and the identification code stored in the first storage unit. The main body includes a receiving unit for receiving the data sent by the sending unit; a detecting unit for detecting the identification code from the data received by the receiving unit; and a processing unit for processing the image data received by the receiving unit based on a result of the detection made by the detecting unit.

7 Claims, 12 Drawing Sheets

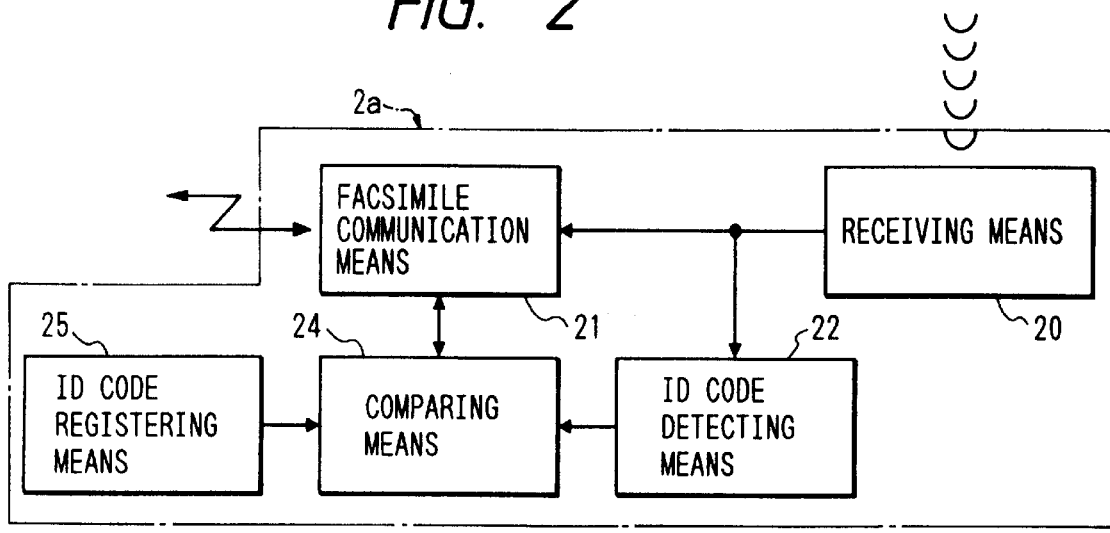
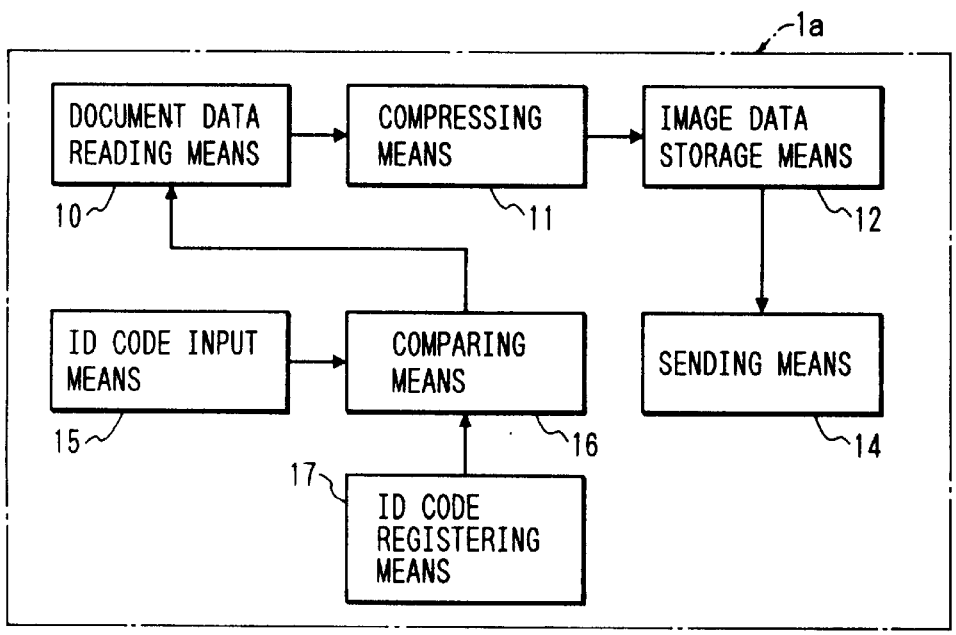

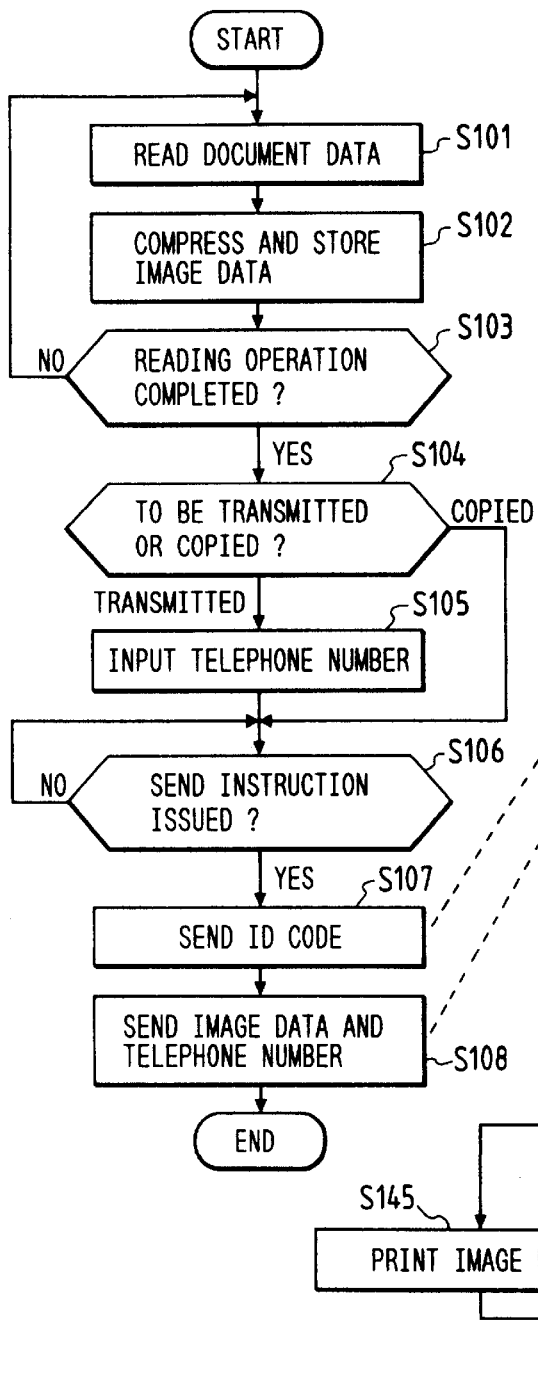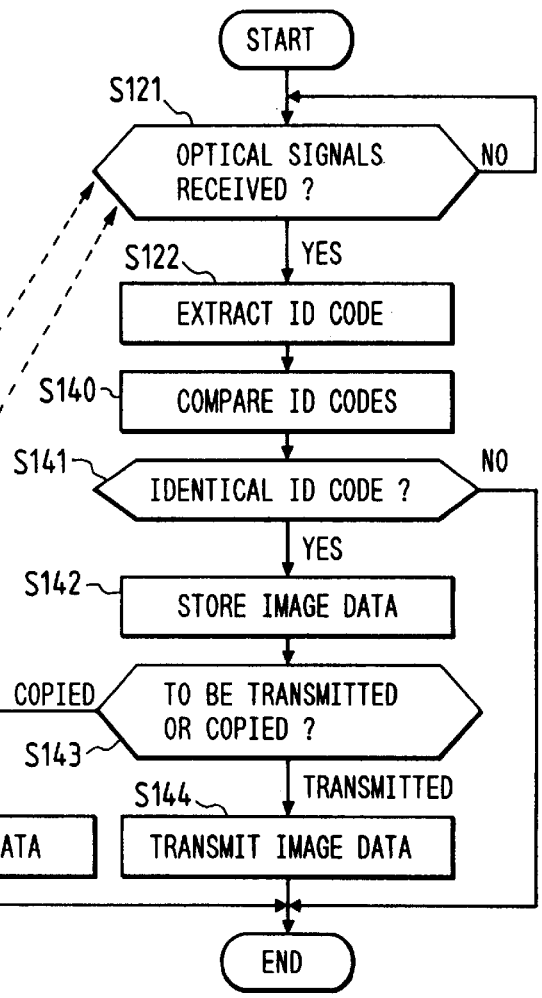
FIG. 6(a)
FIG. 6(b)

FACSIMILE SYSTEM

BACKGROUND OF THE INVENTION

The invention relates to a facsimile system. More particularly, the invention is directed to a facsimile system in which a scanner for reading image data and a main body for receiving the image data are separately arranged and in which the image data read by the scanner is sent to the main body so that facsimile transmission can be performed at the main body.

A facsimile system coupled with a handy scanner is conventionally known. The handy scanner is employed to read image data when part of a large document such as a drawing or newspaper or part of a thick book is to be transmitted by the facsimile system. The handy scanner includes, e.g., a contact-type image sensor and rollers and guides which cause the image sensor to slide over a document. The handy scanner is moved over the document to optically read image data, converts the read image data into an electric signal, and sends the electric signal to a host machine, i.e., the main body of the facsimile system (hereinafter referred to simply as "main body") through a signal line. The main body that has received the image data from the handy scanner transmits to another facsimile system by sending the image data to a communication line.

By the way, in such a conventional facsimile system, the handy scanner is connected to the main body by a cable, which permits supply of power from the main body to the handy scanner and transmission of a signal from the handy scanner to the main body. For this reason, the handling of the cable becomes cumbersome, which impairs user-friendliness of the facsimile system.

To overcome the above shortcoming, a facsimile system is disclosed in Japanese Patent Unexamined Publication No. Sho. 63-193658. This system is characterized as eliminating the power cable by providing a built-in battery in the handy scanner and as transmitting and receiving signals by an infrared light-emitting means that serves as a transmitting means provided on the handy scanner and a light-receiving means that serves as a receiving means provided on the main body.

A facsimile system proposed in Japanese Utility Model Unexamined Publication No. Hei. 2-49264 is characterized as operating the main body by radio waves of a predetermined frequency generated by a remote controller. This system does not employ any handy scanners to read documents.

The above-mentioned conventional facsimile system has encountered the following problems. The above system may be sometimes operated by, e.g., locating the main body at a predetermined fixed position and locating a plurality of handy scanners at plurality of open-to-the-eye but remote places in an office room. In other words, the facsimile system can be operated on a so-called "personal use" basis, in which the main body serving as a host machine is accessed by each handy scanner that is used by an individual employee or by a small number of employees to transmit image data.

However, when a plurality of handy scanners are arranged as described above, there is a problem that the control of communication records becomes difficult, each communication record indicating which handy scanner is used for what kind of transmission.

Further, if a plurality of main bodies are located close to one another, there is a problem that the plurality of facsimile systems may be operated simultaneously by remote operation of a handy scanner.

Still further, if the number of handy scanners is increased, their safekeeping and supervision becomes insufficient, hence imposing the problem of permitting, e.g., unauthorized use by unauthorized users.

Moreover, there is a case in which a plurality of main bodies and a plurality of handy scanners belonging to each main body are located in a single office room and in which each pair consisting of a main body and a plurality of corresponding handy scanners is used by group. In this case, since a conventional facsimile system is designed to neither identify a handy scanner serving as a terminal nor supervise the plurality of handy scanners individually, a light-receiving means provided on a main body is likely to receive erroneously optical signals which are not outputted from the handy scanners belonging to the main body and which are therefore not addressed to the light-receiving means.

Such erroneous reception makes an intra-group supervision difficult, which may cause a user of a handy scanner to happen to use a main body that is remote from him even if there is a main body close to him or which may bring about a highly frequent use of a particular handy scanner.

The main body that has received image data from a plurality of handy scanners has conventionally sent such image data to a communication line simply in the order of reception. However, it may contribute to a more efficient use to give priority levels of transmission to users of a plurality of handy scanners or to their locations.

Since the conventional system is not designed to identify each handy scanner serving as a terminal nor to supervise the plurality of handy scanners individually, only such simple operation as described above has heretofore been performed. The transmission of image data cannot be supervised by priority.

SUMMARY OF THE INVENTION

An object of the invention is therefore to overcome the above-mentioned problems encountered by the conventional art and to provide a facsimile system having a plurality of handy scanners, which not only allows easy control of communication records and selective remote operation of a desired system even if a plurality of main bodies are located close to one another, also prevents unauthorized use of the system by unauthorized users.

Another object of the invention is to provide a facsimile system which can supervise a plurality of handy scanners belonging to a single main body individually.

Still another object of the invention is to provide a facsimile system which can transmit image data in accordance with the priority level given to each of a plurality of handy scanners.

To achieve the above objects, the invention provides a facsimile system having a terminal and a main body, the terminal reading an image and sending the read image to the main body and the main body transmitting the image data received from the terminal through a communication line. The terminal includes means for instructing processing of the read image at the main body; first storage means for storing an identification code specifically assigned to the terminal; and means for sending to the main body the image data, the instruction data instructed by the processing instructing means, and the identification code stored in the first storage means. Further, the main body includes means for receiving the data sent by the sending means; means for detecting the identification code from the data received by the receiving means; and means for processing the image data received by the receiving means based on a result of the detection made by the detecting means.

BRIEF DESCRIPTION OF THE DRAWINGS

FIG. 2 is a functional block diagram of a second embodiment of the invention;

FIG. 3 is a functional block diagram of a third embodiment of the invention;

FIG. 6a and 6b are a flowchart showing an operation of the second embodiment of the invention;

DETAILED DESCRIPTION OF THE PREFERRED EMBODIMENTS

The invention will now be described in detail with reference to the accompanying drawings.

Figure 1:
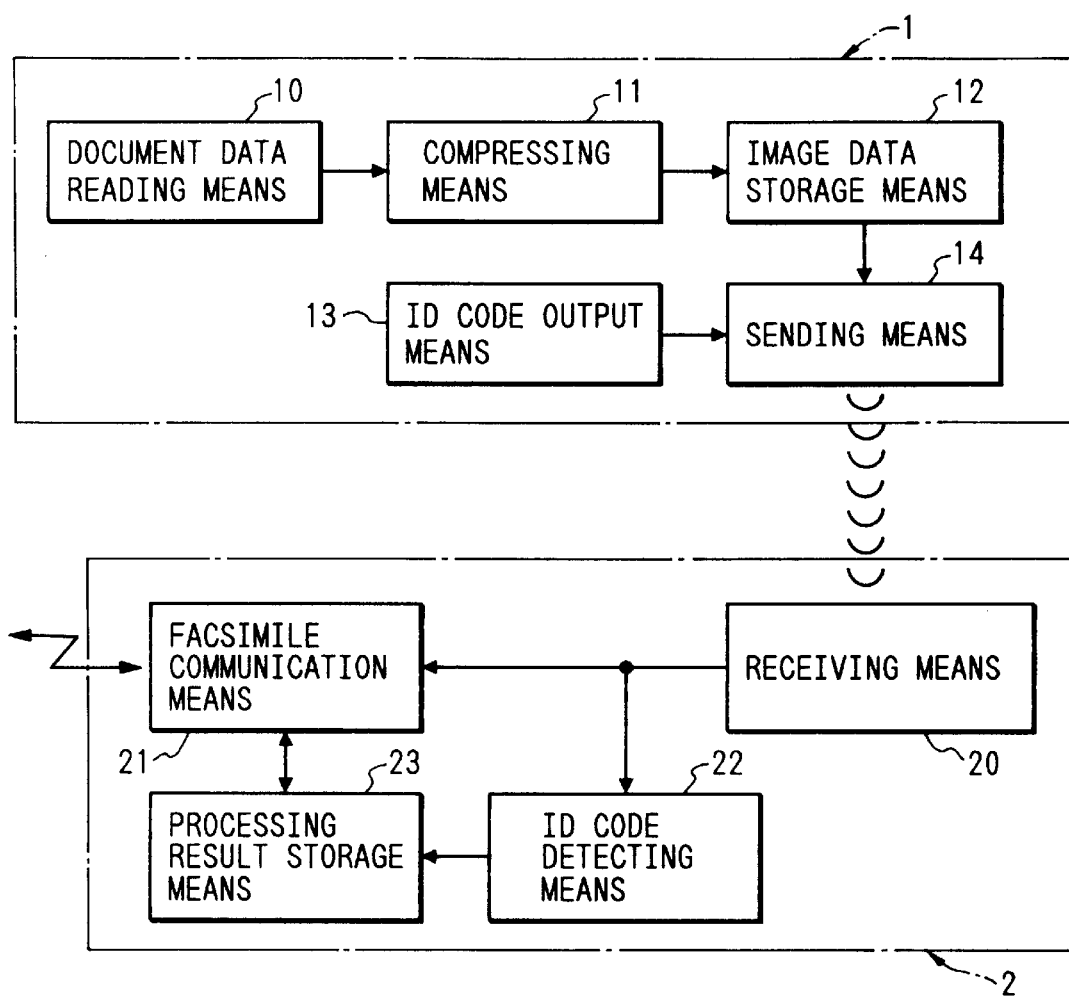
FIG. 1 is a functional block diagram of the invention.

FIG. 1 is a functional block diagram of the invention.

A document data reading means 10 of a handy scanner 1 reads document data and converts the read document data into image data. A compressing means 11 compresses the image data applied from the document data reading means 10 by coding. The compressed image data is then stored in an image data storage means 12.

An identification code output means 13 outputs an identification code (hereinafter abbreviated as "ID code") specifically assigned to the handy scanner 1. A sending means 14 sends the image data stored in the image data storage means 12 to a main body 2 by radio communication together with the ID code.

In the main body 2, a receiving means 20 receives the image data and the ID code sent from the handy scanner 1. The received image data is applied to a facsimile communication means 21, whereas the ID code is detected by an ID code detecting means 22. The detected ID code is applied to a processing result storage means 23. The facsimile communication means 21 either transmits or copies the image data sent from the handy scanner 1 and applies such processing result to the processing result storage means 23. The processing result storage means 23 supervises and stores the processing result with the ID code detected by the ID code detecting means 22.

In such a configuration, the image data read by the image data reading means 10 of the handy scanner 1 is compressed by the compressing means 11, temporarily stored in the image data storage means 12, and then sent to the main body 2 by the sending means 14 together with the ID code applied from the ID code output means 13.

The main body 2 transmits the received image data by the facsimile communication means 21 to a predetermined destination, and outputs a communication record of the transmission to the processing result storage means 23. The communication record indicates the date and time of the transmission, the name of the destination, the fee of the transmission, etc. When the main body 2 has copied the received image data on a recording sheet, the number of recording sheets used is applied to the processing result storage means 23. The processing result storage means 23 supervises and stores, by the detected ID code, the processing result such as the communication record and the number of copies together with the image data. The contents of the processing result storage means 23 are recorded on a recording sheet or the like by the facsimile communication means 21.

Figure 7:
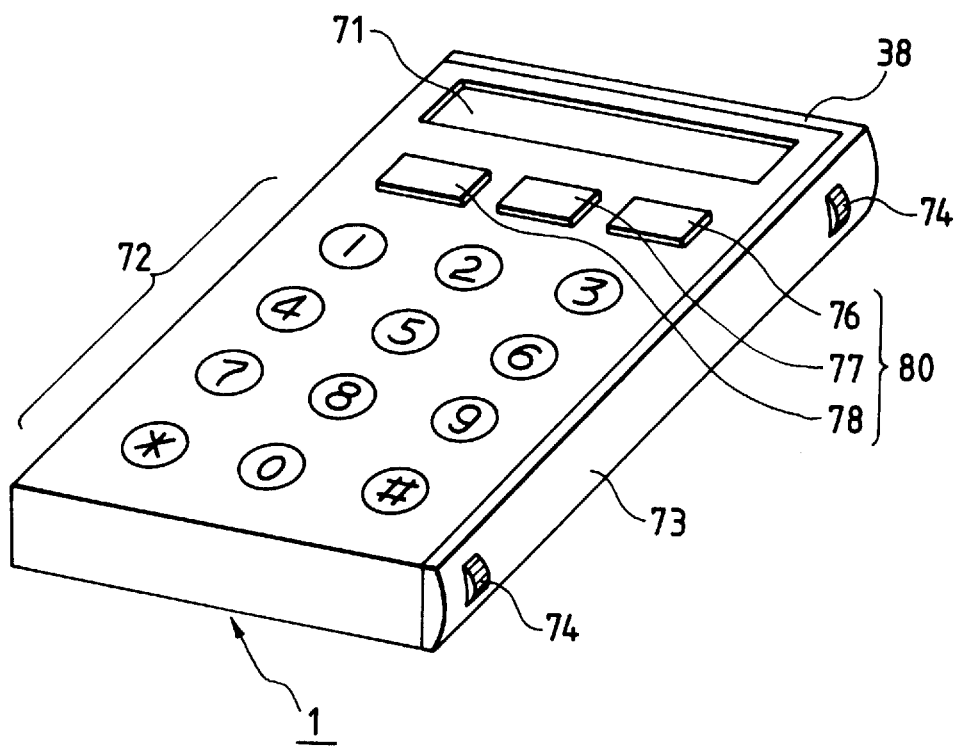
FIG. 7 is a perspective view of a handy scanner in the first embodiment of the invention.

FIG. 7 is a perspective view showing the handy scanner 1 of a facsimile system, which is a first embodiment of the invention.

On the main surface of the handy scanner 1 are a display section 71, a ten-key section 72, and function keys 80. The function keys 80 consists of a send key 76, a start key 77, and a select key 78.

An image sensor 73 is provided on one end of a long side of the handy scanner 1, whereas a light-sending section 38 is provided on one end of a short side thereof. Rollers 74 are provided on both sides of the end having the image sensor 73 to detect the scanning speed of the handy scanner 1.

Figure 4:
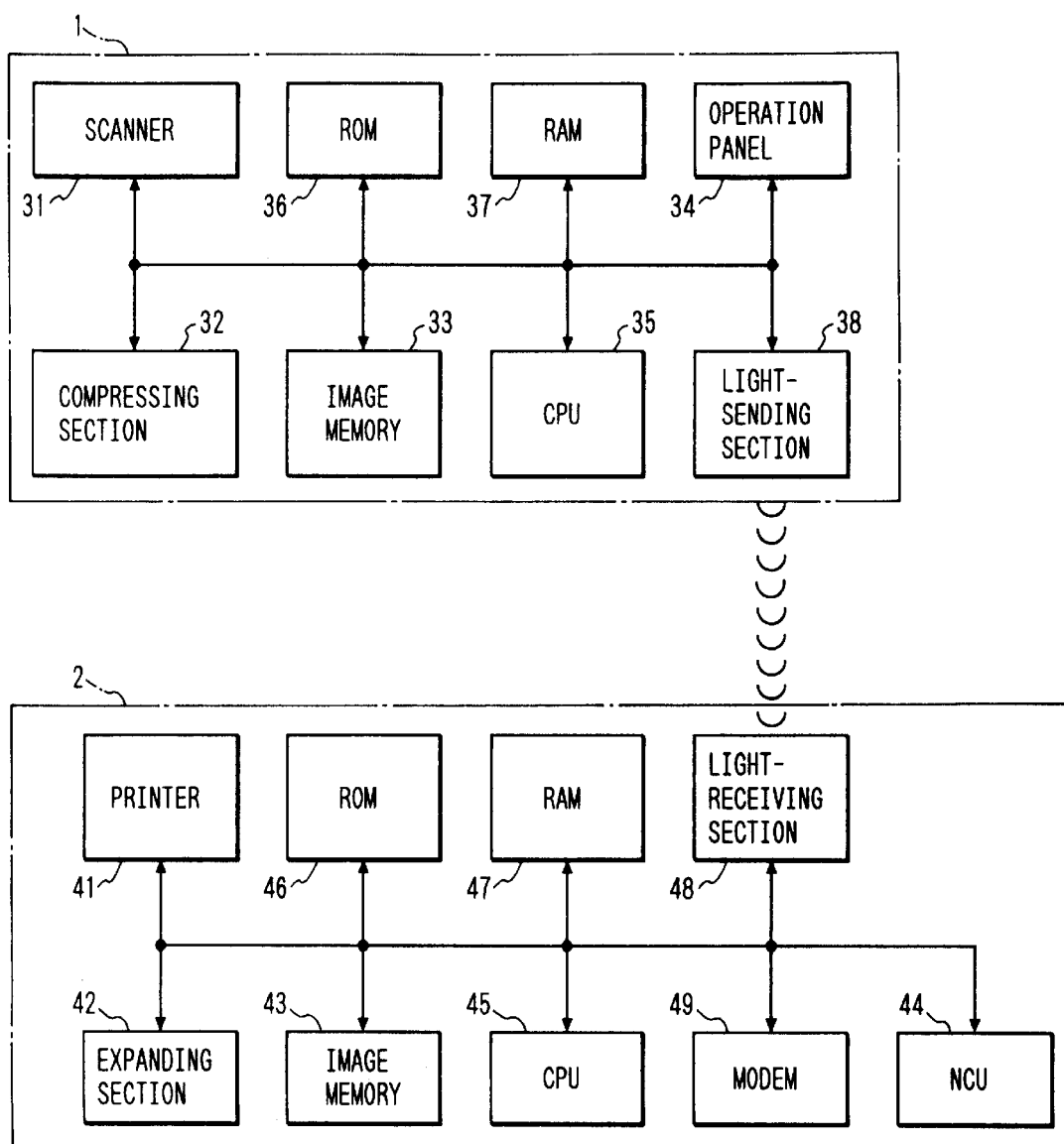
FIG. 4 is a block diagram of a facsimile system, which is a first embodiment of the invention.

FIG. 4 is a schematic block diagram showing the facsimile system, which is the first embodiment of the invention. The same reference numerals as above designate the same or equivalent parts and components. While the facsimile system of the invention has all the parts and components requisite for an ordinary facsimile system, only a configuration indispensable for the invention will be described.

In FIG. 4, a scanner 31 of a handy scanner 1 reads document data and converts the read document data into image data in the form of an electric signal. A compressing section 32 compresses the image data by coding. The compressed image data is then stored in an image memory 33. An operation panel 34 includes a ten-key section and a display section.

A system control section (CPU) 35 controls the overall operation of the handy scanner 1. A ROM 36 stores an ID code specifically assigned to the handy scanner 1 together with various control programs and basic data. A RAM 37 provides a work area and stores data inputted by a user from the operation panel 34. A light-sending section 38 outputs the image data and the ID code while converting them into an optical signal.

A light-receiving section 48 of a main body 2 receives the optical signal outputted from the handy scanner 1 and converts the optical signal into the image data and the ID code. An image memory 43 stores the received image data. An expanding section 42 expands the coded image data by decoding. A modem 49 modulates the image data to be transmitted and demodulates the received image data. A communication line control section (NCU) 44 performs such operations as calling a destination by automatically dialing the telephone number of the destination and carries out predetermined communication procedures based on a predetermined protocol. A printer 41 prints out the received image data on a recording sheet. A CPU 45 controls the overall operation of the main body 2. A ROM 46 stores control programs and various basic data for operating the system. A RAM 47 provides a work area.

Figure 8:
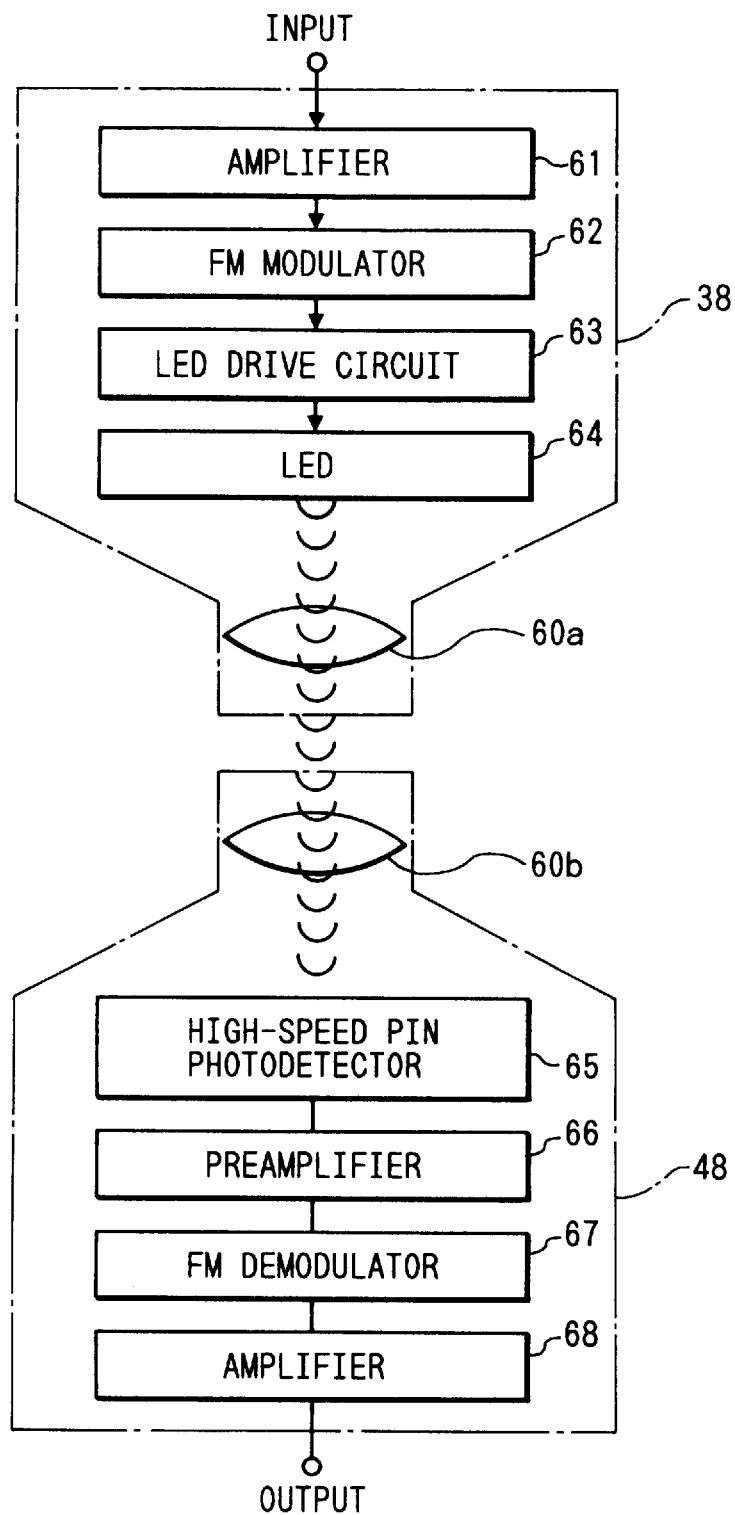
FIG. 8 is a block diagram showing a light-sending section and a light-receiving section.

FIG. 8 is a block diagram showing the configuration of the light-sending section 38 and the light-receiving section 48. Image data and control data applied to the light-sending section 38 are amplified by an amplifier 61, then subjected to frequency modulation (FM) by an FM modulator 62, and applied to a light-emitting diode (LED) drive circuit 63 thereafter. The LED drive circuit 63 drives an LED 64 based on an input signal. An optical signal outputted from the LED 64 is outputted from a lens 60a.

On the other hand, in the light-receiving section 48, the optical signal inputted from a lens 60b is detected by a high-speed PIN photodetector 65 and then converted into an electric signal. The detected signal is amplified by a preamplifier 66, demodulated at an FM demodulator 67, and outputted after amplified by an amplifier 68.

Figure 5A:
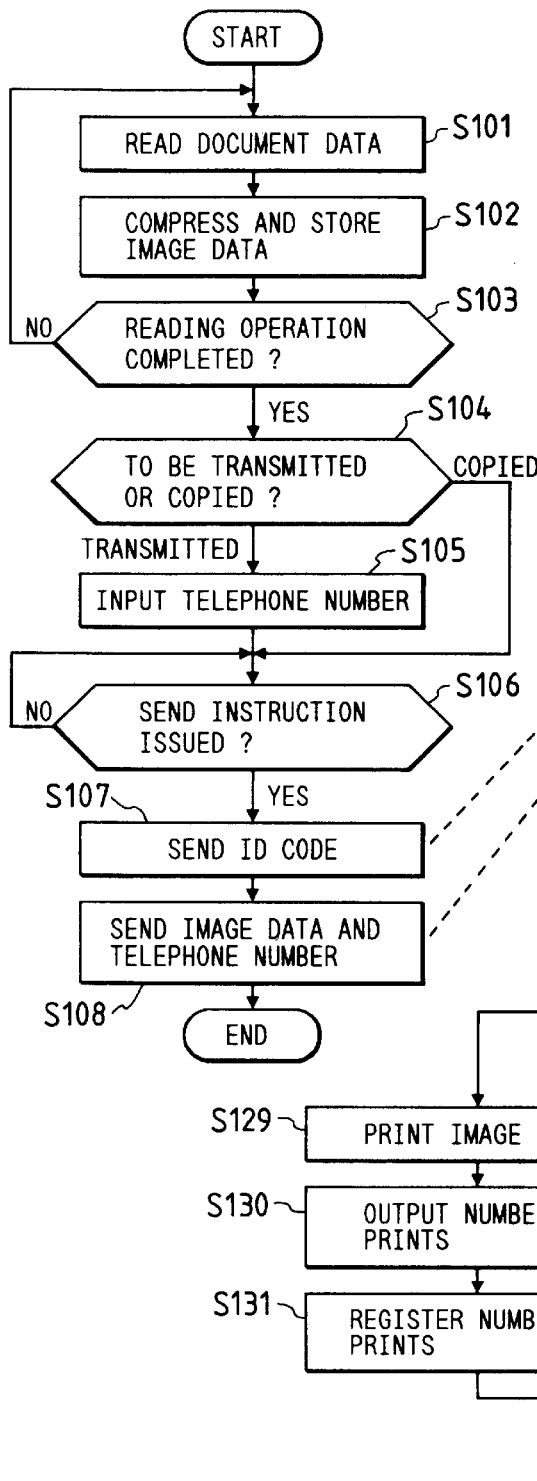
FIGS. 5a and 5b are a flowchart showing an operation of the first embodiment of the invention.
Figure 5B:
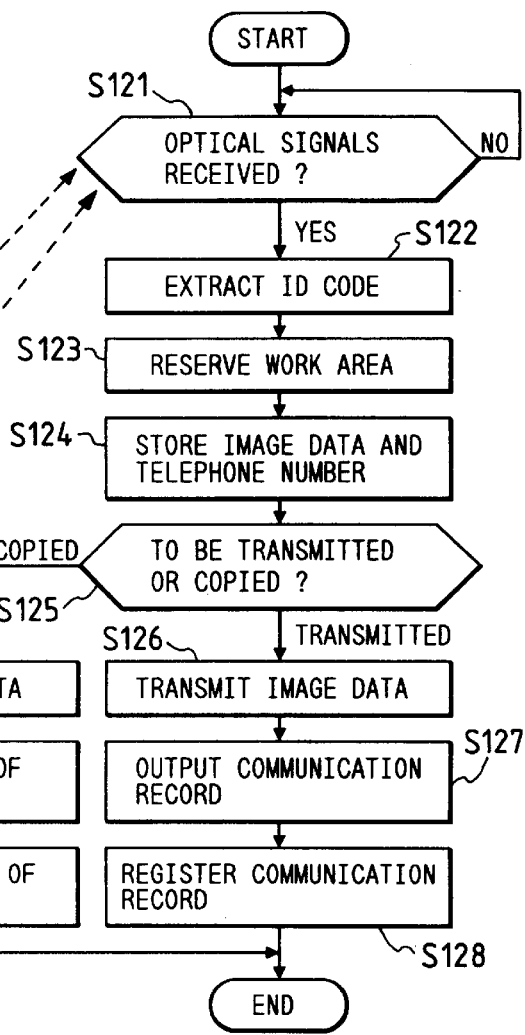

FIGS. 5(a) and 5(b) are flowcharts illustrative of the first embodiment of the invention. FIG. 5(a) shows an operation of the handy scanner 1, and FIG. 5(b) shows an operation of the main body 2.

Upon pressing of a start key 77 that instructs a start of reading document data, document data is read by the scanner 31 and the read data is converted into image data in the form of an electric signal in Step S101. The read image data is compressed in the compressing section 32 by coding and then stored in the image memory 33 in Step S102. Next, it is judged whether or not the reading operation of the document data has been completed in Step S103. The judgment of the document data reading operation completed is made based on, e.g., the rotating speed of the rollers 74 provided to detect the scanning speed of the handy scanner 1.

Upon completion of the document data reading operation, the user instructs that the image data is to be transmitted or copied in Step S104.

If the image data is to be copied, the processing proceeds to Step S106, whereas if the image data is to be transmitted, the telephone number of a destination is inputted from the operation panel 34 and stored in the RAM 37 in Step S105.

In Step S106, it is judged whether or not a send instruction has been issued. Upon issuing of a send instruction by the user while pressing the send key 76 on the operation panel 34, the ID code preregistered in the ROM 36 is read out and converted into an optical signal, and the optical signal is sent from the light-sending section 38 in Step S107. In Step S108, the image data stored in the image memory 33 is converted into an optical signal together with the telephone number stored in the RAM 37, and the converted data is sent from the light-sending section 38.

On the other hand, in the main body 2, the light-receiving section 48 judges whether or not the optical signals from the handy scanner 1 are present in Step S121. When the optical signals have been received, the ID code is extracted from the received optical signals and outputted to the RAM 47 in Step S122. A work area controlled by such ID code is reserved in the RAM 47 in Step S123.

In Step S124, the image data and the telephone number of the destination received by the light-receiving section 48 are stored in the image memory 43 and RAM 47, respectively. In Step S125, it is judged that the image data is to be transmitted or copied. If the image data is to be transmitted, the processing proceeds to Step S126, whereas if the image data is to be copied, the processing proceeds to Step S129.

In Step S126, the telephone number of the destination stored in the RAM 47 is read and automatically dialed by the NCU 44 so that the image data is transmitted. Upon completion of the transmission of the image data, the communication record is outputted to the RAM 47 in Step S127. In Step 128, the communication record is registered in the work area controlled by the ID code.

In Step S129, the image data stored in the image memory 43 is printed out by the printer 41. Upon completion of printing the image data, the number of prints is outputted to the RAM 47 in Step S130. In Step S131, the number of prints is stored in the work area controlled by the ID code.

The first embodiment is characterized as controlling communication records and the number of used recording sheets by the ID code specifically assigned to the handy scanner 1.

Therefore, even if a plurality of handy scanners are involved, how each handy scanner is operated can be monitored with ease, thereby facilitating accounting, sheet fee control, etc.

FIG. 2 is a functional block diagram of a second embodiment of the invention. The same reference numerals as above designate the same or equivalent parts and components. Since the configuration of a handy scanner 1 of the second embodiment is the same as that in the first embodiment, the configuration of only a main body 2a is shown.

In FIG. 2, an ID code registering means 25 has a registration of an ID code of a handy scanner that is permitted to use a facsimile system. A comparing means 24 compares an ID code detected by an ID code detecting means 22 with the ID code registered in the ID code registering means 25, and outputs a result of the comparison to a facsimile communication means 21. The facsimile communication means 21 restricts the operation of the main body 2a based on the result of the comparison made by the comparing means 24.

In such a configuration, when the ID code sent from the handy scanner 1 has been detected by the ID code detecting means 22, the detected ID code is compared with the ID code registered in the ID code registering means 25 by the comparing means 24. The number of ID codes registered in the ID code registering means 25 is not limited to one; the ID code registering means 25 has a registration of the ID codes of all handy scanners that are permitted to use the facsimile system.

The comparing means 24 permits the facsimile communication means 21 to receive the image data when the ID code detected by the ID code detecting means 22 is registered in the ID code registering means 25. If the detected ID code is not registered, the comparing means 24 prohibits the facsimile communication means 21 from receiving the image data.

An operation of the second embodiment of the invention will be described with reference to the block diagram shown in FIG. 4 and flowcharts shown in FIGS. 6(a) and 6(b). Since the processing steps designated by the same reference numerals as in FIGS. 5(a) and 5(b) are the same or equivalent processing steps in the flowcharts shown in FIGS. 6(a) and 6(b), the description thereof will be omitted.

In the main body 2a, the light-receiving section 48 judges whether or not optical signals from the handy scanner 1 have been received in Step S121. If the optical signals have been received, an ID code is extracted from the optical signals and the extracted ID code is stored in the RAM 47 in Step S122. In Step S140, ID codes preregistered in the ROM 46 are compared with the detected ID code stored in the RAM 47. In Step S141, if there is an ID code that is identical with the detected ID code, then the image data is permitted to be inputted. If there is no identical ID code, then the image data is prohibited from being inputted, and this processing is terminated.

When the image data is permitted to be inputted, the received image data and the telephone number of a destination are stored in the image memory 43 and the RAM 47, respectively, in Step S142. In Step S143, it is judged that the image data is to be transmitted or copied. If the image data is to be transmitted, the processing proceeds to Step S144, whereas if the image data is to be copied, the processing proceeds to Step S145.

In Step S144 the telephone number of the destination stored in the RAM 47 is read, and the NCU 44 automatically dials to transmit the image data. In Step S145, the image data stored in the image memory 43 is printed out by the printer 41.

The second embodiment is thus characterized as permitting a remote operation of the main body 2a by a handy scanner only when an ID code preregistered in the main body 2a is found identical with the ID code outputted from the handy scanner. Therefore, even if a plurality of main bodies are placed close to one another, only the desired main body can be accessed remotely.

Further, since the remote operation by a handy scanner that outputs a different ID code is prohibited, unauthorized use or erroneous operation can be prevented.

While the ID code outputted from a handy scanner is preset to the handy scanner in the above-mentioned first and second embodiments, the invention is not limited thereto. The ID code may be inputted from the operation section 34 of the handy scanner 1 by the user when the system is to be used.

Such a technique, allowing individual users to use all the handy scanners, contributes to efficient use of the handy scanners.

FIG. 3 is a functional block diagram of a third embodiment of the invention. The same reference numerals as above designate the same or equivalent parts and components. Since the configuration of a main body in the third embodiment is the same as in FIGS. 1 and 2, the configuration of only a handy scanner 1a is shown.

In FIG. 3, an ID code is inputted from an ID code input means 15 by a user and outputted to a comparing means 16. An ID code registering means 17 has a preregistered ID code that identifies an individual user who is permitted to use the facsimile system and a section to which the user belongs. The number of ID codes to be registered in the ID code registering means 17 is not limited to one; the ID codes of all the users who are permitted to use the facsimile system are registered.

The comparing means 16 compares an ID code outputted from the ID code input means 15 with an ID code registered in the ID code registering means 17. When both ID codes are found identical, the comparing means 16 permits an image data reading means 10 to read image data, whereas when both ID codes are not identical, the comparing means 16 prohibits the image data reading means 10 from reading the image data.

In such a configuration, to read document data by the handy scanner 1a and to send the read image data to the main body, the user inputs an ID code assigned to himself first. If the ID code inputted by the user is registered in the ID code registering means 17, the comparing means 16 permits the image data to be read, thus allowing reading and sending of the image data, whereas if the ID code inputted by the user is not registered in the ID code registering means 17, the comparing means 16 prohibits the image data from being read, thus not allowing the image data to be read.

The third embodiment is characterized as not allowing the handy scanner to be used unless an ID code inputted by a user is identical with an ID code preregistered in the handy scanner. Therefore, unauthorized use of the system by those other than authorized users can be prevented.

Figure 9:
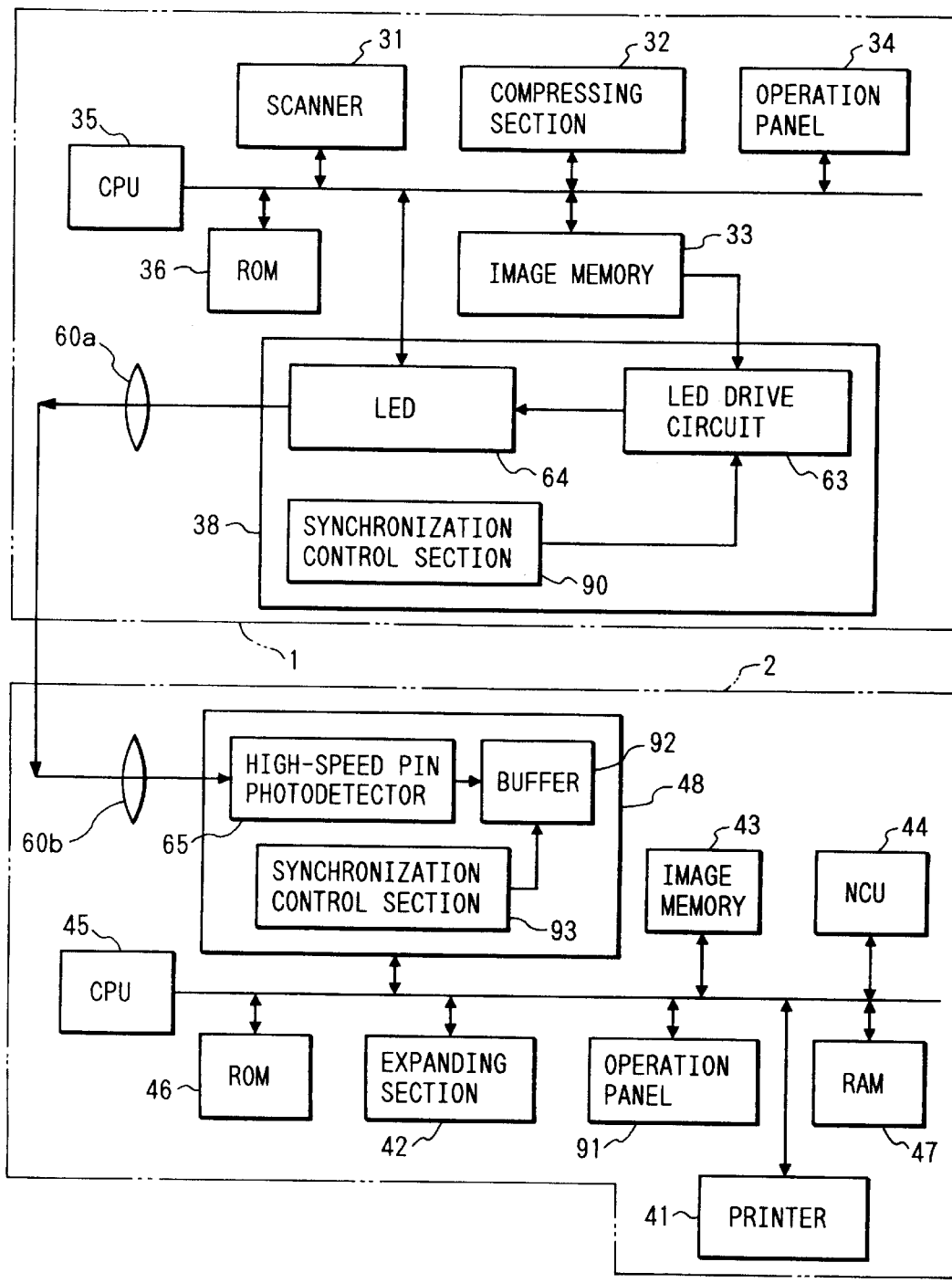
FIG. 9 is a block diagram showing a hardware configuration of a facsimile system, which is a fourth embodiment of the invention.

FIG. 9 is a block diagram showing a hardware configuration of a facsimile system, which is a fourth embodiment of the invention. The same reference numerals as above designate the same or equivalent parts and components. In FIG. 9, a handy scanner 1 serving as a terminal includes a scanner 31, a compressing section 32, an image memory 33, a light-sending section 38, and an operation panel 34 for inputting transmission data and the like. These components are controlled by a CPU 35, which is a microcomputer, in accordance with programs stored in a ROM 36 in advance.

Further, the light-sending section 38 includes an LED 64, an LED drive circuit 63, and a light emission synchronization control section 90. The LED drive circuit 63 supplies a predetermined current to the LED 64 for emitting a light beam. The light emission synchronization control section 90 controls timing for causing the LED 64 to be forward-biased by the LED drive circuit 63. The light beam emitted from the LED 64 is projected outside through a lens 60a.

A main body 2 includes an image memory 43, an expanding section 42, a communication line control section (NCU) 44, a light-receiving section 48, a RAM 47, an operation panel 91, a printer 41, and a CUP 45 for controlling the respective components. A ROM 46 is also provided to store programs and control data for control by the CPU 45. The light-receiving section 48 includes a high-speed PIN photodetector 65, a buffer 92, and a light reception synchronization control section 93. The high-speed PIN photodetector 65 converts the optical signal, which has exited from the light-sending section 38 of the handy scanner 1 and which has been injected via a lens 60b, into an electric signal. The buffer 92 stores an output signal of the high-speed PIN photodetector 65. The light reception synchronization control section 93 controls timing for receiving a signal from the high-speed PIN photodetector 65 to the buffer 92.

The thus configured facsimile systems are used while placed at positions that are open to the eye to one another. Further, the operation of sending image data from the handy scanner 1 to the main body 2 is performed in the following manner.

The image data of a document read by the scanner 31 while sliding the handy scanner 1 over the document is stored in the image memory 33 after compressed by the compressing section 32. Upon completion of reading the image data, the image data stored in the image memory 33 is sent to the LED drive circuit 63 in accordance with an instruction inputted from the operation panel 34. The LED drive circuit 63, based on the image data supplied from the image memory 33, forward-biases the LED 64 by outputting an on/off signal corresponding to such image data. The on/off signal is outputted in accordance with the synchronizing signal supplied from the light emission synchronization control section 90 to the LED 64.

When the image data is sent from the handy scanner 1 to the main body 2, transmission instruction data inputted from the operation panel 34 is also sent to the main body 2. The transmission instruction data is irradiated from the light-sending section 38 to the main body 2 as an optical signal in a manner similar to the image data. To send the data, the handy scanner 1 is oriented toward the main body 2 so that the optical signal emitted from the LED 64 can be irradiated to the light-receiving section 48.

In the main body 2, the image data received by the light-receiving section 48 from the handy scanner 1 is temporarily stored in the image memory 43. In the case where a plurality of pieces of image data are received from a plurality of handy scanners, these image data are read out from the image memory 43 in the order of receiving the transmission instruction data that have been received together with the image data, and sent to a communication line through the communication line control section (NCU) 44.

The image data read by the handy scanner 1 not only is transmitted to a destination facsimile system, but also may, in some cases, be printed out at the main body 2 of the source facsimile system using the printer 41. In such a case, print instruction data inputted from the operation panel 34 is sent together when the image data is sent from the handy scanner 1 to the main body 2.

In the fourth embodiment, the main body 2 that has received either the transmission instruction data or the print instruction data execute the processing in accordance with the instructed data only when such instruction data has been received from a predetermined terminal. Thus, the plurality of handy scanners forming a group in combination with a specific main body 2 and supervised by the main body 2 are given different ID codes, respectively.

In contrast thereto, the main body 2 has a reference table including the plurality of ID codes given to the handy scanners 1 in the same group. This reference table is stored in the RAM 47 in accordance with input from the operation panel 91. Therefore, when some of the handy scanners 1 in the same group supervised by the main body 2 have been updated, the data in the reference table can be deleted or added by an input from the operation panel 91.

Figure 10:
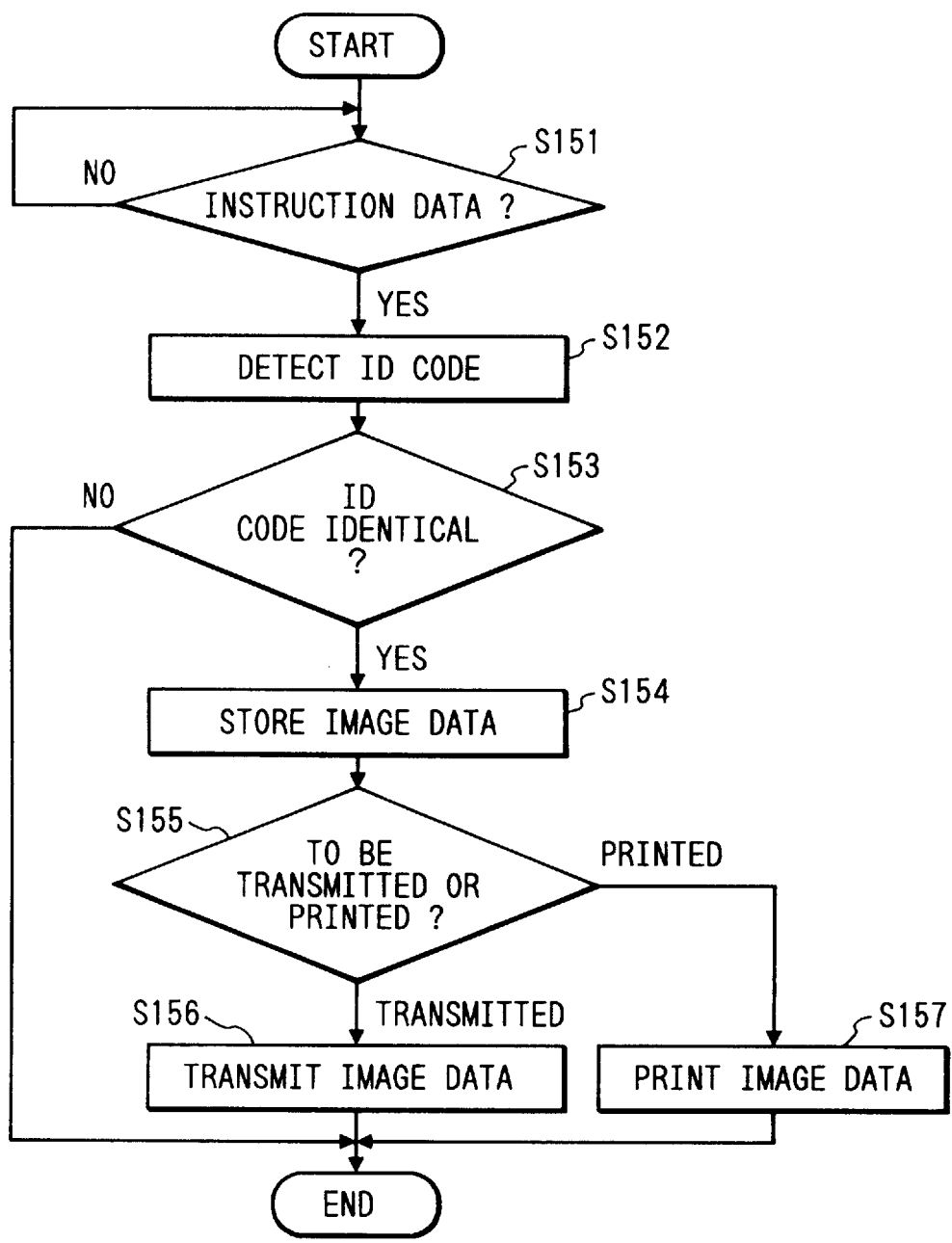
FIG. 10 is a flowchart showing a transmission operation performed by a main body in the fourth embodiment of the invention.

An exemplary operation of the main body 2 which is performed by judging an instruction from the handy scanner 1 will be described with reference to a flowchart shown in FIG. 10. In FIG. 10, it is judged whether or not instruction data has been inputted from the handy scanner 1 in Step S151. If the instruction data has been inputted, the processing proceeds to Step S152, in which an ID code is detected from the instruction data. In Step S153, the detected ID code is referred with ID codes stored in the reference table to judge whether or not the ID code detected in Step S152 is identical with a predetermined ID code.

If the judgment result is affirmative in Step S153, i.e., it is judged that the instruction data has been supplied from the predetermined handy scanner, then the processing proceeds to Step S154, in which the image data supplied from the handy scanner 1 is stored in the image memory 43.

In Step S155, the type of instruction by the instruction data is judged. If the type of instruction is transmission of image data, then the image data is transmitted in Step S156. If, on the other hand, the type of instruction is printing of the image data read by the handy scanner 1, then the image data is printed by the printer 41 in Step S157.

Since the image data transmitting operation and image data printing operation are the same as those performed by a conventional facsimile system, the indication and description of a detailed flowchart thereof will be omitted.

Figure 11:
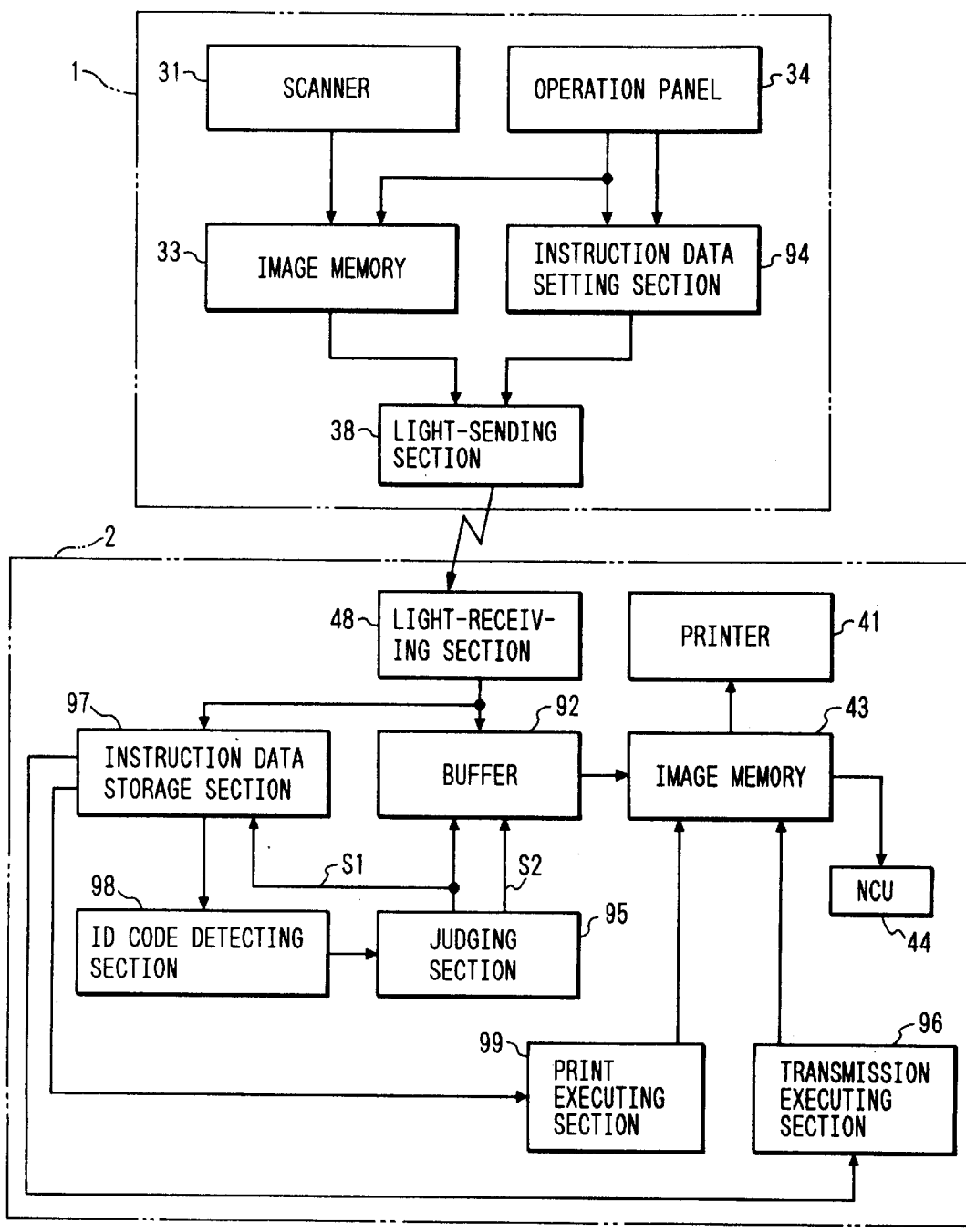
FIG. 11 is a block diagram showing main functions of the facsimile system shown in FIG. 9.

The function of the CPUs 35 and 45 for performing the above operations will be described next. FIG. 11 is a block diagram showing main functions of the fourth embodiment. In FIG. 11, the instruction data inputted from the operation panel 34 is set to an instruction data setting section 94. If an image data transmission is instructed, the instruction data therefor are data such as the dialing number of a destination and a transmission time, whereas if an image data printing is instructed, the instruction data are data such as the number of prints and reduction/enlargement setting conditions. ID codes specifically assigned to the respective handy scanners 1 are preset in the instruction data setting section 94, whereas the image data read by the scanner 31 is stored in the image memory 33.

In response to the transmission instruction or the print instruction inputted from the operation panel 34, the image data is read out from the image memory 33, whereas the transmission instruction data or print instruction data, and the ID code are read out from the instruction data setting section 94 and the read data are then supplied to the light-sending section 38. The light-sending section 38 outputs the supplied image data, transmission instruction data or print instruction data, and ID code after converting them into an optical signal.

The light-receiving section 48 of the main body 2 receives the optical signal outputted from the light-sending section 38 of the handy scanner 1, and the image data out of the optical signal is temporarily stored in the buffer 92. In the meantime, the transmission instruction data or print instruction data, and the ID code are stored in an instruction data storage section 97. An ID code detecting section 98 detects the ID code from the instruction data. The detected ID code is supplied to a judging section 95 to judge the identity thereof with a predetermined ID code.

If the detected ID code is identical with the predetermined ID code, then an identity signal s1 is outputted to the buffer 92 and the instruction data storage section 97. The image data is sent from the buffer 92 to the image memory 43 in response to this identity signal s1, whereas the instruction data is outputted from the instruction data storage section 97. The transmission instruction data out of the instruction data is outputted to a transmission executing section 96, and the print instruction data is outputted to a print executing section 99.

An instruction from the transmission executing section 96 is supplied to the image memory 43 and the communication line control section 44, and the image data is sent to the communication line control section 44 in accordance with such instruction. The communication line control section 44 calls a destination in accordance with the transmission instruction data and transmits the image data. An instruction from the print executing section 99 is supplied to the printer 41, and the printer 41 prints out the predetermined image data in accordance with the print instruction data.

If the ID codes are judged to be unidentical in the judging section 95, an unidentity signal s2 is outputted to the buffer 92, and the image data stored in the buffer 92 is cleared in response to this unidentity signal s2.

As described above, the fourth embodiment is characterized not only as identifying each of a plurality of handy scanners 1 by the main body 2 based on the ID code specifically assigned to each handy scanner 1, but also as causing the main body 2 to execute the processing in accordance with an instruction from a handy scanner 1 only when the handy scanner 1 has been identified.

A fifth embodiment of the invention will be described next. Since a basic hardware configuration of a facsimile system according to the fifth embodiment of the invention is substantially the same as in the fourth embodiment (FIG. 9), the illustration and description thereof will be omitted.

In the fifth embodiment, the operation of sending image data to a main body 2 from a handy scanner 1 will be performed in the following manner.

Image data of a document read by a scanner 31 while sliding a handy scanner 1 over the document is compressed by a compressing section 32 and the compressed data is stored in an image memory 33. Upon completion of reading the image data, the image data stored in the image memory 33 is sent to an LED drive circuit 63 in accordance with an instruction inputted from an operation panel 34. The LED drive circuit 63 forward-biases an LED 64 while outputting an on/off signal corresponding to the image data based on the image data supplied from the image memory 33. The on/off signal is outputted to the LED 64 in accordance with the synchronizing signal supplied from a light emission synchronization control section 90.

In sending the image data from the handy scanner 1 to the main body 2, transmission instruction data inputted from the operation panel 34 is also sent to the main body 2. The transmission instruction data is irradiated from a light-sending section 38 to the main body 2 as an optical signal in a manner similar to the image data. In sending the optical signal, the handy scanner 1 is oriented toward the main body 2 so that the optical signal emitted from the LED 64 can be irradiated onto a light-receiving section 48.

In the main body 2, the image data received by the light-receiving section 48 from the handy scanner 1 is temporarily stored in an image memory 43, and the transmission instruction data is stored in a RAM 47. Further, the image data is sent to a communication line through a communication line control section (NCU) 44 at a specified transmission time if such transmission time is included in the transmission instruction data or immediately if no such transmission time is specified. If transmission instructions are inputted from a plurality of handy scanners, image data are sent to the communication line in accordance with the priority level (described later) so that the image data received from a scanner whose priority level is higher is sent first.

The order of execution at the main body 2, i.e., the priority level is determined in the following manner. When the main body 2 supervises a plurality of handy scanners 1, each of the plurality of handy scanners 1 is given a different ID code.

In contrast thereto, the main body 2 has a table serving as a supervising area, in which each of the plurality of ID codes is tied with a priority level. This table is stored in the RAM 47 in accordance with input from an operation panel 91. Therefore, when the priority level of a handy scanner 1 is altered, the content of the table can be altered by an input from the operation panel 91.

An exemplary operation of transmitting image data by the main body 2 will be described with reference to a flowchart shown in FIG. 12.

Figure 12:
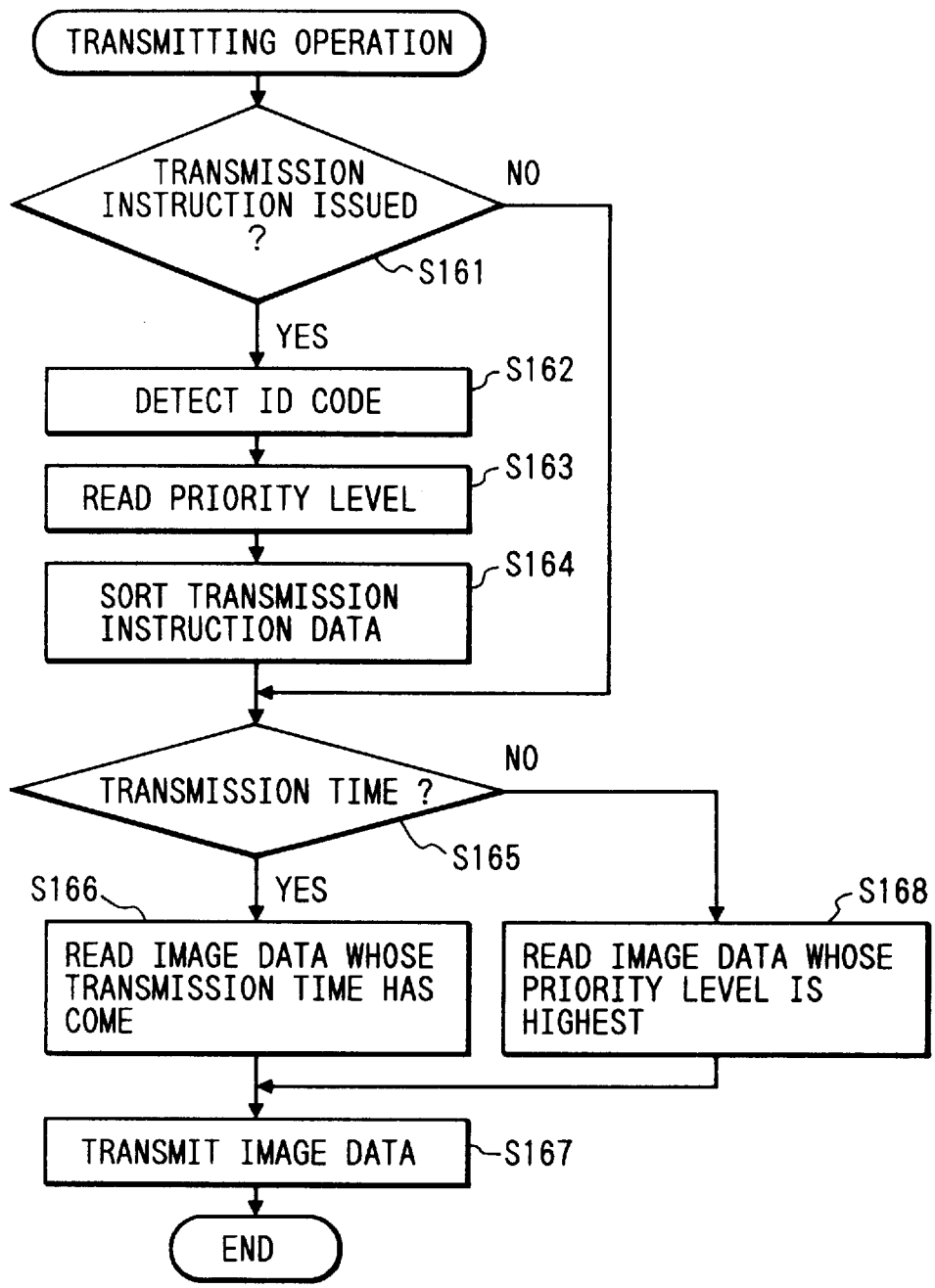
FIG. 12 is a flowchart showing a transmission operation performed by a main body in a fifth embodiment of the invention.

In FIG. 12, it is judged whether or not a new transmission instruction has been inputted from a handy scanner 1 is judged in Step S161. If a new transmission instruction has been inputted, an ID code is detected from the transmission data in Step S162. In Step S163, the detected ID code is supplied to the above table, and a priority level given to this ID code is then read. In Step S164, a queue at a storage section in which the transmission instruction data are stored is sorted based on the read priority level. That is, the pointer of the queue is altered in accordance with the priority level.

If a result of the judgment is negative in Step S161, then the processing jumps to Step S165.

In Step S165, transmission instruction data whose transmission time is specified is searched among the stored transmission instruction data, and it is judged whether or not there is transmission instruction data whose specified transmission time is identical with the present time. If there is such transmission instruction data, the processing proceeds to Step S166 and the image data corresponding to such transmission instruction data is read.

On the other hand, if there is no such transmission instruction data whose specified transmission time has come in Step S165, the processing proceeds to Step S168. In Step S168, the image data corresponding to the transmission instruction data for which no transmission time is specified and whose priority level is the highest is read from the image memory 43.

In Step 167, the image data read in Steps S166 and S168 is transmitted. In addition, jobs are supervised in accordance with the priority level given to each handy scanner. Since the supervision of jobs having priority levels can be achieved with reference to the description in Japanese Patent Unexamined Publication No. Hei. 3-155276, the detailed description thereof will be omitted.

Figure 13:
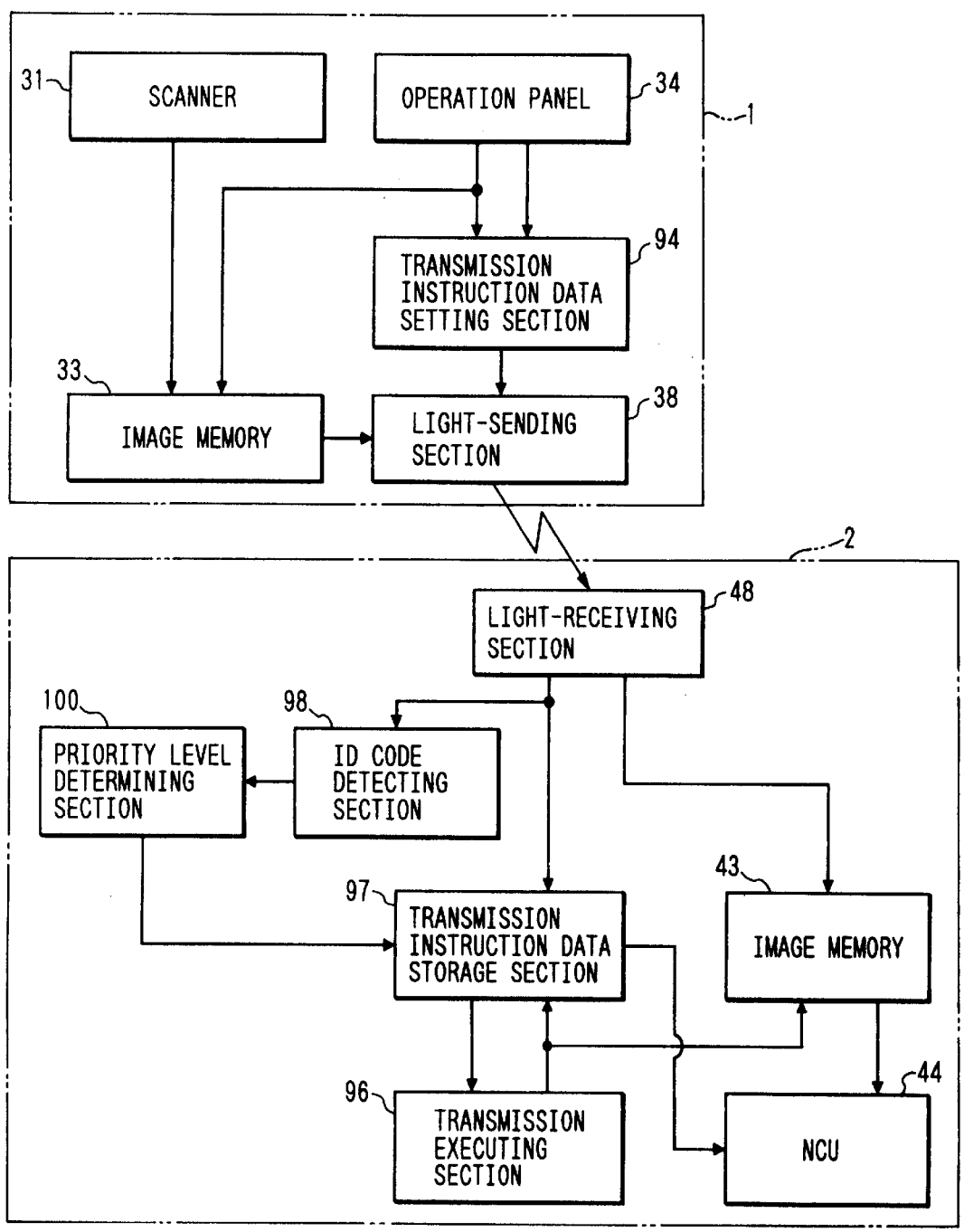
FIG. 13 is a block diagram showing main functions of a facsimile system, which is the fifth embodiment of the invention.

Functions of the CPUs 35 and 45 for performing the above operations will be described next. FIG. 13 is a block diagram showing main functions of the fifth embodiment. In FIG. 13, transmission instruction data inputted from the operation panel 34 is set to a transmission instruction data setting section 94. The transmission instruction data setting section 94 has preregistered ID codes, each of which is specifically assigned to a handy scanner 1. The image memory 33 stores image data read by the scanner 31. In response to the transmission instruction inputted from the operation panel 34, the image data and the transmission instruction data are read from the image memory 33 and the transmission instruction data setting section 94, respectively, and the read data are supplied to the light-sending section 38. The light-sending section 38 converts the supplied image data and transmission instruction data into an optical signal and outputs the optical signal.

The light-receiving section 48 of the main body 2 receives the optical signal outputted from the light-sending section 38 of the handy scanner 1, and out of such optical signal, the image data is stored in the image memory 43 and the transmission instruction data is stored in a transmission instruction data storage section 97. An ID code detecting section 98 detects an ID code from the transmission instruction data. The detected ID code is supplied to a priority level determining section 100, and the priority level corresponding to each ID code is added to the transmission instruction data. A queue in the transmission instruction data storage section 97 is determined by the priority level and the specified transmission time. That is, the transmission instruction data whose transmission times are specified are sorted in the sequence of specified transmission time, whereas the transmission instruction data whose transmission times are not specified are sorted by the priority level.

A transmission executing section 96 reads the transmission instruction data that heads the queue and the image data corresponding to such transmission instruction data to the communication line control section 44. The communication line control section 44 calls up a destination in accordance with the transmission instruction data and transmits the image data.

As described above, the fifth embodiment is characterized not only as identifying each of a plurality of handy scanners

1 by the ID code that is specifically assigned to each handy scanner 1, but also as causing the main body 2 to transmit the image data by the priority level set to each identified handy scanner.

What is claimed is:

1. A facsimile system having a plurality of terminals and a main body, each of said plurality of terminals reading an image and said main body being connected to a communication line and receiving image data from said plurality of terminals, wherein each of said terminals comprises:

means for instructing processing of said read image at said main body;

first storage means for storing an identification code for identifying each of said terminals; and means for sending to said main body said image data, instruction data instructed by said processing instructing means, and said identification code stored in said first storage means, and wherein said main body comprises:

means for receiving said data sent by said sending means;

means for detecting said identification code from said data received by said receiving means;

means for processing through the communication line said image data received by said receiving means based on said instruction data received by said receiving means; and means for storing a result of the processing performed by said processing means together with said identification codes.

2. The facsimile system according to 1, wherein said sending means includes light-emitting means and said receiving means includes light-receiving means, said sending and receiving means achieving an optical communication.

3. The facsimile system according to claim 1, wherein said main body further comprises:

second storage means for storing an identification code; and means for comparing the identification code stored in said second storage means and the identification code received by said receiving means, wherein said processing means performs processing in accordance with a result of the comparison made by said comparing means.

4. The facsimile system according to claim 3, wherein said second storage means includes a rewritable memory.

5. The facsimile system according to claim 3, wherein said main body further comprises:

third storage means for storing said image data received by said receiving means; and fourth storage means for storing a priority level corresponding to said identification code, wherein said processing means performs processing in an order based on said priority level stored in said fourth storage means and said identification code received by said receiving means.

6. The facsimile system according to claim 5, wherein said fourth storage means includes a rewritable memory.

7. The facsimile system according to claim 1, wherein said terminal further comprises:

password input means; and means for comparing a password inputted by said password input means and said identification code specifically assigned to said terminal, wherein said sending means is controlled in accordance with a result of the comparison made by said comparing means.

* * * * *